METHOD AND APPARATUS FOR MOUNTING A DRUM TO A HUB

Original Filed Sept. 14, 1967 Sheet 1 of 2

INVENTOR.
BERNARD SPIEKER
BY
Constantine A. Michalos

METHOD AND APPARATUS FOR MOUNTING A DRUM TO A HUB

INVENTOR.
BERNARD SPIEKER
BY
Constantine A. Michalos
ATTORNEY

United States Patent Office 3,440,119

Patented Apr. 22, 1969

3,440,119

METHOD AND APPARATUS FOR MOUNTING A DRUM TO A HUB

Bernard Spieker, New Milford, N.J., assignor to The Bendix Corporation, Teterboro, N.J., a corporation of Delaware Original application Sept. 14, 1967, Ser. No. 667,855. Divided and this application Apr. 27, 1964, Ser. No. 362,891

Int. Cl. B32b *17/06, 15/02*

U.S. Cl. 156—99 5 Claims

ABSTRACT OF THE DISCLOSURE

Method and apparatus for mounting a computer memory drum to a hub without the use of heat treatment. A drum of material such as glass is mounted to a metal hub on a shaft, the hub having axially extending fingers to flexibly grip one peripheral end of the drum. An arbor extends from the shaft within the hub and drum. Jacks project radially from the arbor and are adjustable to engage and align the drum with respect to the hub and the drum may be permanently cemented to the hub, and the arbor and jacks thereafter removed.

*Cross reference to related application*

The optical drum and securing hub device is described and claimed in a U.S. application Ser. No. 667,855, filed Sept. 14, 1967, by Bernard Spieker as a division of the present application and assigned to The Bendix Corporation, assignee of the present invention.

This invention relates to a method and means of accurately and mechanically rigidly fastening a high precision optically coded glass drum to a spindle or hub fabricated of a dissimilar material, without using heat or other means of securing the glass drum to the dissimilar material.

Heretofore, it has been the practice to use magnetic memory systems for digital computer bulk memory systems for digital computer bulk memory systems utilizing magnetic drums or cores or punched tapes. Sophisticated aerospace needs present a problem to the computer memory art, since the storage capacity requirements necessitate a system's storage density not anticipated or efficiently solved by the present day computers. As the program length increases, with mission complexity, the common magnetic bulk memory devices cannot handle the storage capacity needed without invalidating the basic needs of an efficient computer having high storage density, fast resolution rate, small size and light weight. In the present day magnetic memory systems, the memory devices that have high storage efficiency have inherently long access time. Conversely, memory devices which have fast random access times have low bit densities and hence poor storage efficiencies. The utilization of the former devices sacrifices computation speed, and therefore, severely limits the operation of the arithmetic unit for the sake of capacity, while the use of the latter, inherently faster devices dictates that large capacity can only be obtained at the price of increased size and weight. The systems became too bulky to be applied to the aerospace field where information in the range of one million bits of information may be desired. In addition, the present day magnetic memory drums are unsatisfactory for aerospace use because they have a disadvantage of being sensitive to stray electric and magnetic fields which caused inaccuracies, and therefore produced a memory system having an additional disadvantage in inefficient permanent memory storage.

The solution of the problem lies in providing an optical memory system which utilizes the combination of the desirable features of high storage efficiencies found in magnetic drums or tapes with the fast random access times found in magnetic core arays. Since the aerospace computer system is designed specifically for its intended application, its program and significant portions of other stored data are permanent in nature. This permits the substitution of optical techniques for magnetic techniques in the design of the storage memory system. The use of an optical device which has a much higher packing density and permanent storage results in a more reliable memory system. Therefore, the optical device can be made smaller in size and weight than its equivalent magnetic counterpart.

The problem is not simply solved by substituting an optical drum for a magnetic drum. It necessitates mechanically rigidly fastening a highly precise optical glass drum with materials which may be very dissimilar in physical properties that may damage the glass drum. That is, it involves the assembly of a weak or brittle material such as glass, quartz, or crystals of various salts like KBr or NaCl to a strong ductile material such as steel.

To assemble a brittle material to a very hard material presents difficulties especially when the junction between these materials is subjected to a wide range of dynamic stresses or stresses caused by changes of temperature. A junction which grips the brittle material lightly will not secure the glass drum at high rotational speeds or severe environmental vibrations. A junction which grips the glass drum tightly may shatter the material due to thermal shock.

It is, therefore, among the principal objects of this invention to provide, in an optical memory system, a means of locating, aligning, and securing a high precision optical glass drum to a dissimilar material such as metal, wthout destroying the precise optical properties of the glass drum.

Another object of the invention is to provide a simple means of securing a precision optically coded glass information drum to a metal hub which in turn is supported in one assembly by an electric motor, to provide therewith a high motor shaft alignment acuracy for highly accurate reading of the coded information on said drum.

Another object of this invention is to provide, for an optical glass drum, a flexible support by utilizing a serrated circularly encasing metal hub.

A further object of this invention is to provide a means of attaching a hollow optical glass drum to a metal hub having the construction of multiple spring fingers extending circumferentially around the drum and at an angle to each other, which fingers have the flexibility along the axis of force for absorbing mechanical or thermal shock which the glass drum is subjected to without disturbing the accurate alignment of the drum, and without damaging the optics of the glass.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
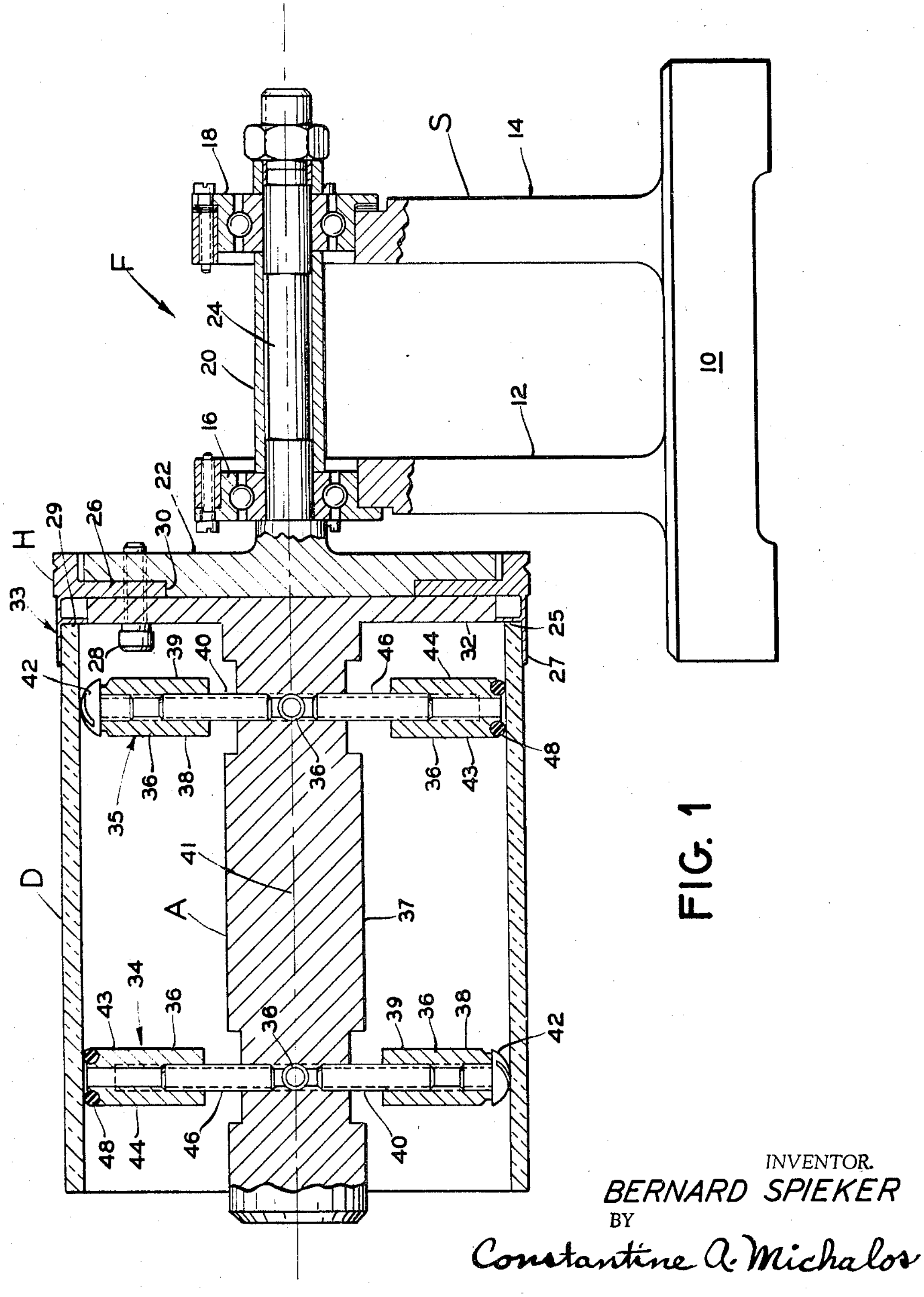
FIGURE 1 is a side view of a preferred means of aligning and securing the device in accordance with a preferred embodiment of the invention.

Referring to the drawing in detail, the embodiment of this invention primarily provides for a means employed to secure a high precision optically coded glass cylinder or drum D, which is very brittle, to a spindle or hub H made of hard material such as metal.

As shown in FIGURE 1, a special locating, aligning, and securing fixture F is used for the process of connecting the glass drum D onto the metal hub H. The special fixture F is shown comprising a supporting jig S and an aligning jig A.

The supporting jig S is made up of a heavy base portion 10 having a pair of parallel upwardly extending brackets 12 and 14. Disposed at the upper ends of the brackets 12 and 14 are bearing assemblies 16 and 18 which in turn support a shaft 20. The shaft 20 includes a flange portion 22 integral to an axle portion 24. The flange 22 and the axle 24 of the shaft 20 is every accurately machined so that the plane of the flange 22 is exactly 90 degrees to the axle 24. Therefore, the bearing assemblies 16 and 18 locate the shaft 20 so that the shaft 20 with the flange portion 22 is concentrically aligned with the aligning jig A which holds the drum D internally while the drum D is coaxially aligned with the shaft 20. That is, until a dial indicator (not shown) on the periphery of the drum D shows that substantially zero run-out has been attained.

The same shaft 20, after alignment and attachment of the drum D onto the hub H, as herein more fully described, may be reassembled and used as the motor shaft of an electric motor disclosed and claimed in a U.S. Patent No. 3,319,095, granted May 9, 1967, to Bernard Spieker, and assigned to The Bendix Corporation, the same assignee as the present invention.

The aforesaid flange 22 is secured to an inwardly directed circular plate portion 26 of the hub H and to the aligning jig A, by means of four bolts 28. The flange 22 and in turn the shaft 20 are initially aligned with the hub H by a close tolerance central bore 30 located on the circular plate 26. It should be noted that the aligning jig A is first aligned and attached to the hub H and flange 22 before mounting the glass drum D onto the hub H.

The glass drum D is approximately 2½ inches long by 2 inches in diameter and is very similar to a magnetic drum except that it is a highly precise optical glass cylinder having on its surface a photographic emulsion on which is inscribed microphotographically an information pattern, as more fully described in the copending U.S. application Ser. No. 336,487, filed Jan. 8, 1964, by Lee et al., and assigned to The Bendix Corporation, the same assignee as the present invention.

Figure 4:
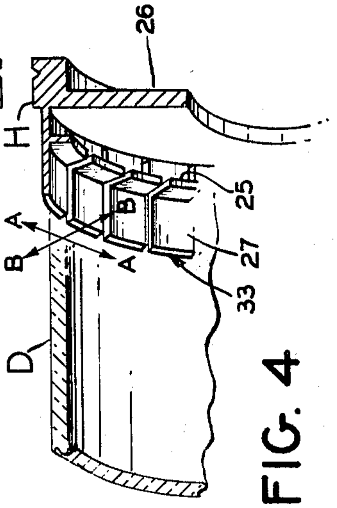
FIGURE 4 is a detailed view of a fragment of the device shown in FIGURE 2.

As shown in FIGURE 1, the hub H is assembled with the special fixture F so that its inwardly directed circular plate portion 26 is interposed between a flange 32 of the aligning jig A and the flange 22 of the shaft 20. When the special fixture F is properly aligned with the bearing assemblies 16 and 18, the glass drum D is inserted within a plurality of flexible serrations or spring fingers 33 extending perpendicularly to the inwardly directed plate portion 26 of the hub H. The spring fingers 33 are formed primarily of a second radially inwardly directed plate or stop 25 and an integral shallow cylinder 27 extending circumferentially 90 degrees to the stop 25. The stop 25 and the cylinder 27 are separated to form the plurality of serrations or fingers 33, as best shown in FIGURE 4. Each finger 33 has substantially an L-shape configuration. The plate or stop 25 forming one leg and the cylinder 27 forming the other leg. During the aligning procedure, an edge 29 of the glass drum D abuts against the second inwardly directed plate or stop 25. A bonding means, such as epoxy cement, may be interposed between the spring fingers 33 and the stop 25 and cylinder 27 of the hub H and the lower edge 27 and lower side portion of the glass drum D to further provide a rigid junction between the hub H and the drum D.

The aligning jig A further comprises a pair of jack assemblies 34 and 35. Each jack assembly 34 or 35 comprises four jacks 36 extending radially outwardly of a central portion or arbor 37 of the jig A. The jacks 36 extend substantially at 90 degrees one to the other. Jacks 38 of each jack assembly 34 and 35 comprise a nut 39 with a headless screw 40 extending radially inwardly towards an axis 41 of the arbor 37, and a nylon screw 42 extending radially outwardly of the axis 41. Other jacks 43 of the jack assemblies 34 and 35 are located diametrically opposite to the jacks 38. Each of the jacks 43 comprises a nut 44, a headless screw 46 extending radially inwardly towards the axis 41 of the arbor 37, and an O-ring 48. The headless screw 40 with the nylon screw 42 are used with the nut 39 and the headless screw 46 with the O-rings 48 are used with the nut 44 to adjust the alignment of the drum D on the hub H, prior to the hardening of the cement bond as herein described. That is, as clearly shown in FIGURE 1, the nuts 39 and 44 may be rotated to extend the nylon screw 42 radially outwardly and the O-ring 48 radially inwardly of the axis 41 or in reverse for aligning the drum D onto the hub H. The drum D with the aligning jig A supported by the shaft 20 may then be rotated and observed. If the drum D does not run concentrically of the shaft 20, further adjustment may be made to the nuts 39 and 44 until there is no run-out of the drum D relative to the hub H and the shaft 20.

When alignment is completed, the epoxy cement is allowed to cure, and the complete assembled hub-drum unit may then be removed from the special fixture F by releasing all of the jacks 36. The hub-drum unit may then be released from the jigs S and A by removing the four bolts 28.

Figure 2:
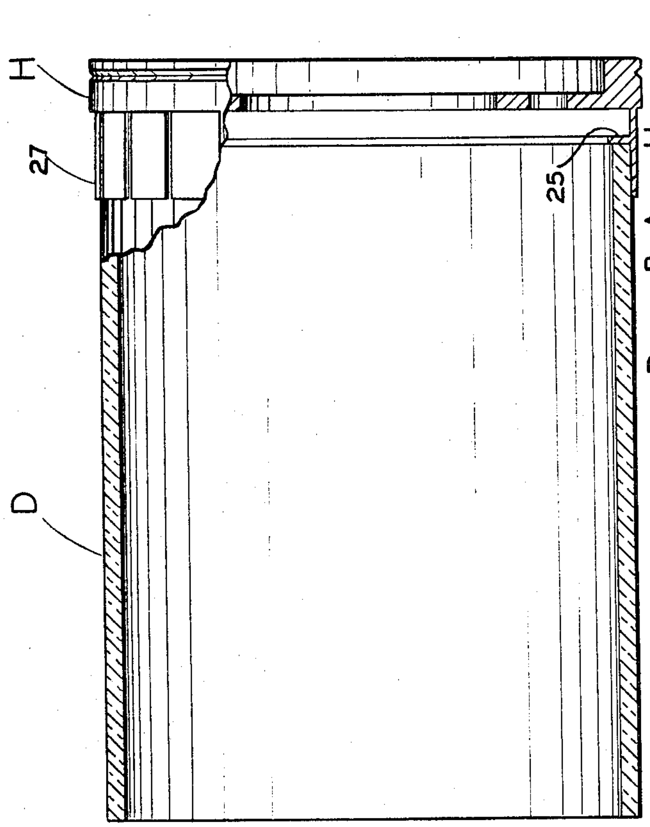
FIGURE 2 is a side elevation of the device shown in an assembled condition.

As shown in FIGURES 2 and 4, the hub-drum unit now comprises the optical glass cylinder or drum D permanently mounted on the unique metal spindle or hub H. The glass drum D is of optical quality and the mechanical dimensions, which must be held, prevent any means of heating or glass blowing after the drum D is attached to the hub H. That is, it is necessary to completely optically finish the glass surface of the drum D, after cooling, and then assemble the metal hub H without any further heating. The glass drum D is made of lime glass polished to the best optical finish. It is clear and free of strains, pebbles, and other defects. The glass is sensitized by coating with a microfilm type emulsion capable of high resolution and high contrast. The emulsion-coated drums are placed on an indexing head and then have a microphotographic pattern laid down on their sensitized surface. The drum is developed similarly to an ordinary photographic film. In addition, it should be noted that the hub H must not obscure the optical path but must hold the glass drum D at the tip, as provided in this invention, by the use of the spring finger 33.

The microphotographic pattern is etched onto the presensitized surface of the glass drum D as more fully described in a copending U.S. application Ser. No. 363,085, filed Apr. 28, 1964, by Lee et al., and assigned to The Bendix Corporation, the same assignee as the present invention.

The assembled drum D is mounted in a read-out device which comprises primarily an illuminating means supexternally of the drum, as more fully described in the coported internally of the glass drum and read-out sensors pending U.S. application Ser. No. 336,487.

When the aligning and securing of the drum D onto the hub H is completed, the shaft 20 may be removed from the special fixture F by removal of the four bolts 28. The same shaft 20 can then be reassembled with the drum D and hub H and the whole unit can be inserted within electric motor disclosed and claimed in the U.S. Patent No. 3,319,095.

Figure 3:
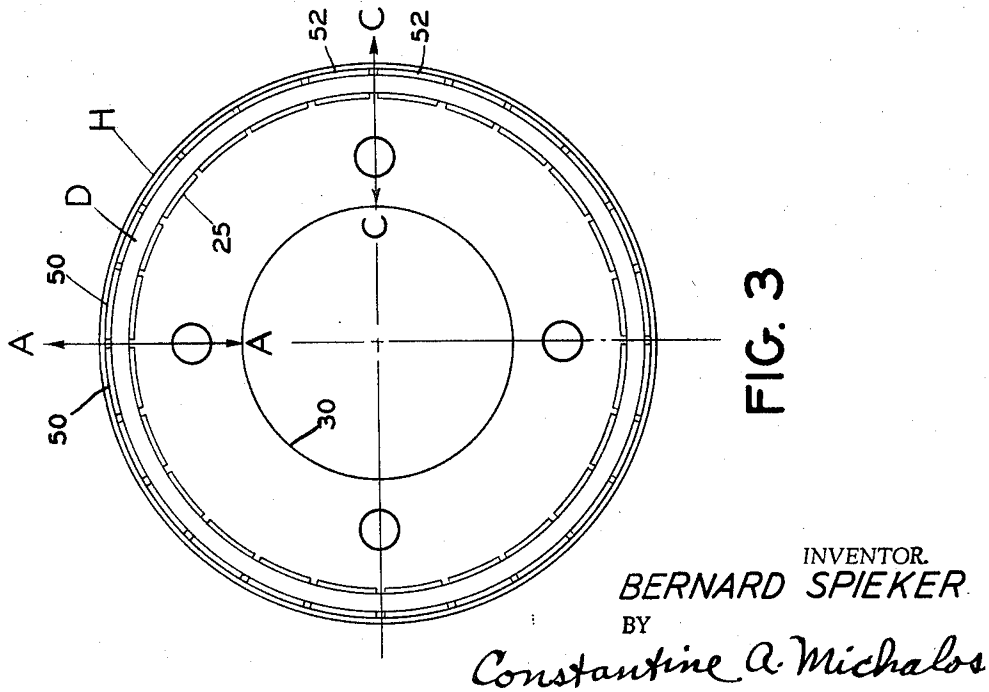
FIGURE 3 is an end view of the device shown in FIGURE 2.

Referring again to FIGURES 2, 3, and 4, it can be seen that the glass drum D is now flexibly but rigidly secured by the plurality of spring fingers 33. Each spring finger has flexibility only along the axis affected by stresses produced by mechanical or thermal shock. As is well known, any structure will more effectively resist a force across its widest portion, as shown by arrows A—A of FIGURE 4, than across its narrowest portion, as shown by arrows B—B of the same figure. That is, fingers 50 and the fingers diametrically opposite, are flexible in a direction A—A as shown in FIGURE 3. Fingers 52 and the fingers diametrically opposite are flexible in the direction C—C. Fingers flexing in this specific manner absorb the differential expansion. Since the fingers cover all of 360° of the hub circumference, an applied force in any direction on the drum D will always be countered by a set of fingers in optimum position to deflect with the drum as this force is applied to the drum D, to prevent damage to the glass structure.

In addition, the device also provides a means of realigning the drum D after its deflection. This is accomplished by utilizing the support of the adjacent fingers to the flexed fingers. That is: a force A—A, as shown in FIGURE 3, which is applied to the drum D to displace it at right angles to the C—C direction, is absorbed by fingers 52 with the aid of the fingers diametrically opposite; and the force C—C applied to the drum D to displace it at right angles to the first force A—A will be absorbed by the fingers 50 with the aid of the fingers diametrically opposite.

Therefore, in summary, this invention provides for the glass cylinder or drum D, whose outer surface bears coded information, mounted in a special fixture F which supports the drum D concentrically with the hub H while the epoxy cement applied inbetween is cured. The fixture F comprises the heavy base portion 10 supporting the two bearing assemblies 16 and 18 at the ends of the parallel upwardly extending brackets 12 and 14. The two bearing assemblies 16 and 18 support the rotating shaft 20 which may be an exact representation of the motor shaft as described in the U.S. Patent No. 3,319,095. Attached to this shaft 20 is the drum D and hub H which are to be assembled, and the aligning jig A which aligns the glass drum D prior to its assembly with the hub H. The aligning jig A has the two sets of jack assemblies 34 and 35, one at each end of the drum D. Each of the jack assemblies has four jacks 36 placed on the arbor 37 of the aligning jig A at 90 degree intervals like spokes of a wheel. The jacks 36 are adjusted radially until the drum D is observed to run concentrically. The epoxy cement is then applied, the drum D and the hub H are assembled and the cement is then cured.

During the entire process of alignment, the drum D is not mounted permanently to the hub H or any holding fixture. It is locked on the hub H by the plurality of spring fingers 33 which can hold it concentrically within .001 inch with the axis of rotation of the hub H. The drum D is placed on the jacks 36 and into the spring fingers 33 of the hub H and a dial indicator (not shown) is positioned so as to read the alterations in radial distance as the drum D is rotated. The drum D is rotated and moved radially by the jacks 36 located on the arbor 37 until the dial indicator (not shown) indicates that a minimum runout has been attained.

As can be noted from the drawing, the drum D is held at the tip by the hub H by the series of external spring fingers 33 in order to provide an optimum view of the coded information of the drum's surface while providing a minimum of stress concentration, as more fully outlined before.

What is claimed is:

1. A method of aligning and securing a coded information optical glass drum to a shallow circular metal hub to provide thereby unobstructed aligned accurate optical reading of the information on the drum, including a supporting jig, an aligning jig axially mounted to said supporting jig, and a plurality of spring fingers disposed around the periphery of said hub and extending perpendicularly thereof; the steps comprising, mounting the aligning jig coaxially with the supporting jig, mounting the metal hub onto the supporting jig, mounting the glass drum onto the aligning jig, rotating the supporting jig and the aligning jig with the glass drum, movably aligning the drum by the aligning jig into the plurality of spring fingers so that said spring fingers encircle and confine one edge portion of said glass drum resiliently within the hub, and bonding said spring fingers with the edge portion of said glass drum when said glass drum is concentrically aligned with said metal hub to permanently and resiliently secure said glass drum into the spring fingers to permit the unobstructed aligned accurate optical reading of the information on the drum.

2. An aligning and securing device for aligning and fastening an information optical memory glass drum to a metal hub employed within an optical memory system for reading the information on said drum upon rotation thereof, and the hub including means for flexibly securing said drum onto said hub; the device comprising a base, a pair of spaced brackets extending parallel upwardly from said base, each bracket mounting a bearing assembly, a shaft coaxially supported for rotation within said bearing assemblies, means for securing the hub onto said shaft for concentric rotation with said shaft, an arbor extending axially from said shaft and within said hub and drum, and means extending radially from said arbor to engage the drum for coaxial alignment of the drum with the metal hub and within the means for flexibly securing said drum onto said hub.

3. The device defined in claim 2 wherein the engaging means includes a set of outwardly extendable jacks for contacting the inside portion of said drum and radially extendable for aligning said drum concentrically with said shaft for flexibly securing it concentrically on the hub.

4. A device for locating, aligning, and securing a coded information optical glass drum to a metal hub, said hub including securing means for circumferentially encircling and securing one edge portion of said glass drum for reading the information on said drum upon rotation thereof, said device comprising a heavy supporting base, a pair of spaced vertical brackets integral to said base extending parallel therefrom, bearing assemblies supported within each of said brackets, said bearing assemblies extending coaxially of each other, a shaft coaxially aligned with said bearing assemblies, a removable aligning jig rotatably supported on said shaft, said shaft having a flange coaxially secured to the end portion, said flange and said aligning jig mounting said hub and said aligning jig rotatably supported on said supporting jig for locating and aligning said glass drum onto said metal hub, said aligning jig further comprising an arbor coaxially aligned with said shaft for concentric rotation therewith, a pair of aligning jigs supported at each end portion of said arbor at each internal end portion of said glass drum, each aligning jig having four radially extendable jacks for movement of each portion of said drum and aligning it concentrically with said shaft and for securing it within said securing means.

5. Apparatus for fastening a high precision coded information optical glass drum to a hub, said hub including means for resiliently securing said glass drum onto said hub when said drum has been concentrically aligned with said hub; said apparatus comprising, a base, a pair of spaced brackets extending upwardly from said base, means for rotatably mounting the hub for reading the information on the drum upon rotation thereof, means for aligning the hub while said hub is rotatably mounted by said hub mounting means in coaxial relation therewith; said aligning means operable to support the drum for alignment with the hub, said aligning means including a pair of spaced jack assemblies located at each internal end portion of said drum, each of said jack assemblies further comprising four jacks, said jacks spaced substantially 90 degrees from each other and operable to move radially outwardly and radially inwardly to align said drum onto said hub for concentric rotation with said hub so that said resilient means may effectively secure said glass drum onto said hub when said drum has been concentrically aligned with said hub.

References Cited

UNITED STATES PATENTS

| | | | |
|---|---|---|---|
| 2,997,412 | 8/1961 | Betts et al. | 200—26 |
| 3,138,510 | 6/1964 | Hindin et al. | 156—416 |
| 3,207,648 | 9/1965 | Shilts | 156—415 |
| 3,315,348 | 4/1967 | Donovan et al. | 29—475 |

ROBERT F. BURNETT, *Primary Examiner.*

W. J. VAN BALEN, *Assistant Examiner.*

U.S. Cl. X.R.

156—415; 161—185, 186